Figure 1:
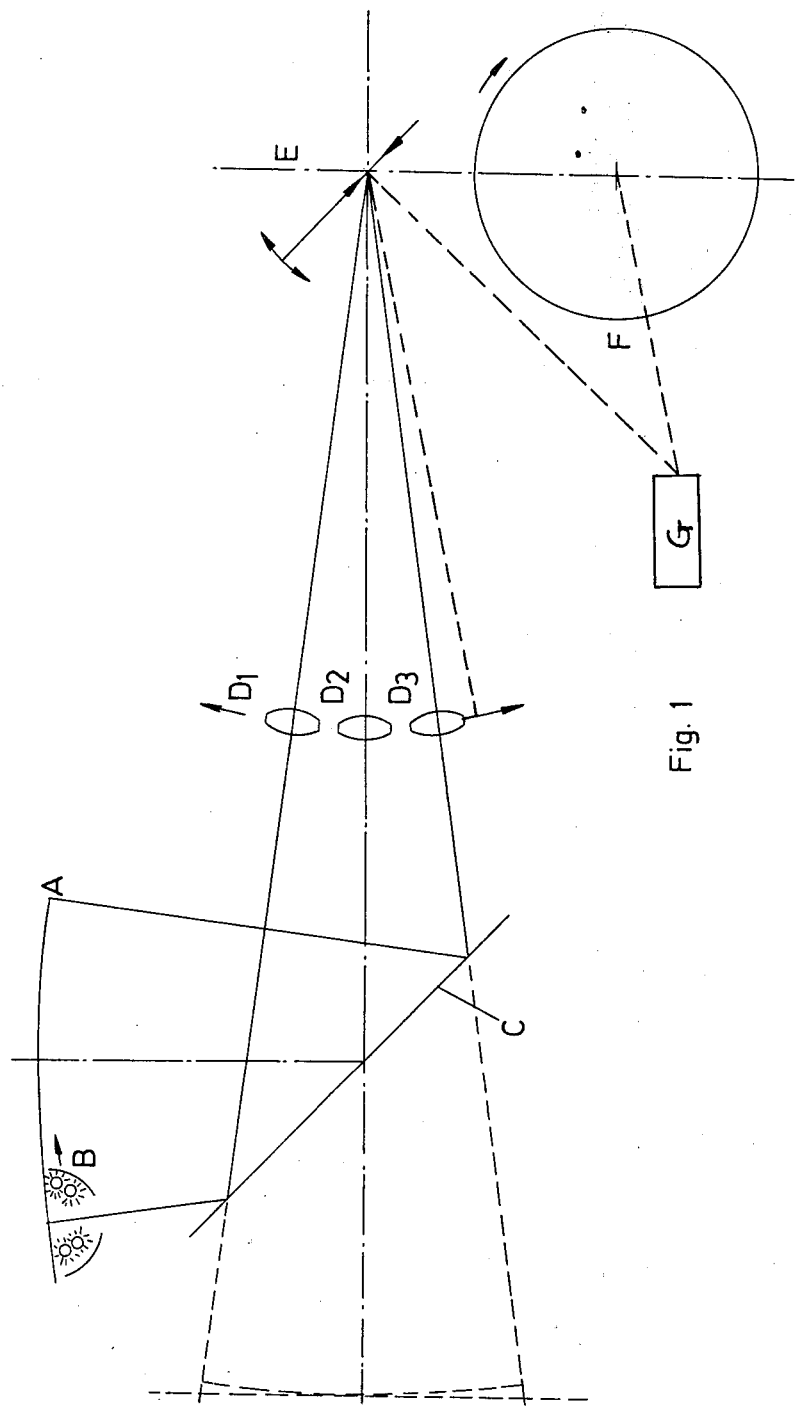

United States Patent [19]

Mihalik et al.

[11] B 3,997,260
[45] Dec. 14, 1976

[54] IMPROVEMENTS IN OR RELATING TO SCANNING LENS SYSTEMS FOR ELECTROSTATIC COPYING MACHINES

[75] Inventors: Nandor Mihalik, Walton-on-Thames; Terence Cunningham Frostick, London, both of England

[73] Assignee: Gestetner Copiers Limited, Tottenham, England

[22] Filed: Sept. 26, 1974

[21] Appl. No.: 509,474

[44] Published under the second Trial Voluntary Protest Program on February 17, 1976 as document No. B 509,474.

[30] Foreign Application Priority Data

Oct. 2, 1973 United Kingdom ............. 46011/73

[52] U.S. Cl. .................................. 355/8; 355/11; 355/49
[51] Int. Cl.² ...................................... G03G 15/04
[58] Field of Search ............. 355/8, 11, 47, 49, 84, 355/104, 81, 66

[56] References Cited

UNITED STATES PATENTS 3,740,137  6/1973  Sato ..................................... 355/66

*Primary Examiner*—Robert P. Greiner
*Attorney, Agent, or Firm*—Fleit & Jacobson

[57] ABSTRACT

The invention relates to electrostatographic copiers and in a first embodiment an optical arrangement is provided in which the image of an original placed on a part-cylindrical platen is reflected via a first mirror through a movable scanning lens onto a second, rotating mirror and thence onto a photoconductive surface of a drum. The platen may be either cylindrical or flat and have the image of the original reflected from a first mirror which is so inclined and dimensioned that substantially the whole of the perpendicular projection of the original falls on the first mirror, the arrangement being such that the optical path length between the original and the drum surface is maintained substantially constant.

12 Claims, 2 Drawing Figures

IMPROVEMENTS IN OR RELATING TO SCANNING LENS SYSTEMS FOR ELECTROSTATIC COPYING MACHINES

The present invention relates to copying machines, and in particular to copying machines in which a strip of an original is observed and the strip-like field is scanned across the original to cover the entire extent of the original.

Conventionally, copying machines of this sort employ a mount for the original, for example a transparent platen, which holds the original and a moving lens which executes a scanning movement and focuses the image at an exposure station. The platen holds the original either in a flat configuration where the lens and/or mirror moves parallel to the flat platen, or preferably in a cylindrical configuration where the lens moves in an arcuate path so that the original-to-lens ray length remains constant during each scan in order to obtain the optimum sharpness of the image at the exposure station. The exposure station may for example coincide with the surface of a charged photoelectric drum on which a latent image is to be produced for subsequent development with a toner.

According to a first aspect of the present invention there is provided a copying machine including a platen having a surface for supporting an object to be copied; a rotatable drum having a photoconductive surface for receiving an image of an object supported on the platen; a first mirror positioned below and spaced from the platen and inclined with respect thereto; a lens mounted for movement along an arcuate path about an axis and constrained to have that axis intersecting the optical axis of the lens, to scan the image reflected in the mirror of an object on the platen; a second mirror on, and mounted for rotation about, the axis of rotation of the lens to reflect light passing from the lens onto the photoconductive surface of the drum; and wherein said first mirror is dimensioned and inclined with respect to the platen so that substantially the whole of the perpendicular projection of said surface of the platen falls on said first mirror.

A copying machine according to the invention allows the definition of the image on the copy sheet to be enhanced.

The optical system defines a zone of sharp focus and an object located in this zone of sharp focus will be reproduced, in sharp focus, on the surface of the drum. However, in order that such an object be reproduced on the surface of the drum in focus and without distortion it is necessary that the portion of the ray path closest to the object be as near to perpendicular to the object as possible. This is because if the object is placed inclined to the ray path in the zone of sharp focus, the effective zone of sharp focus is drastically reduced. This is particularly important in copying apparatus since the physical size of the object, the ray path length between object and drum and the necessity to use as much of the light reflected from the original as possible together give rise to a very small depth of focus.

Because of this small depth of focus, it is also desirable that the object be located in the zone of the sharp focus of the optical system, and this requires that in some way the ray path length between any point of the object and the photoconductive surface of the drum be substantially constant.

According to a second aspect of the present invention there is provided a copying machine including; a platen having a surface for supporting an object to be copied, which surface conforms to a portion of a cylindrical surface; a rotatable drum having a photoconductive surface for receiving an image of an object on the platen; a first mirror positioned below and spaced from the platen and dimensioned and inclined with respect to the platen such that substantially the whole of the perpendicular projection of said surface of the platen falls on said first mirror; a lens mounted for movement along an arcuate path about an axis and constrained to have that axis intersecting the optical axis of the lens, to scan the image reflected in the mirror of an object on the platen; and a second mirror on, and mounted for rotation about, the axis of rotation of the lens to reflect light passing from the lens onto the photoconductive surface of the drum as the lens executes a scanning movement, whereby the length of the ray path from said surface of the platen to the photoconductive surface of the drum is maintained substantially constant.

In such a copier the object supporting surface of the platen preferably conforms to part of a cylindrical surface and the first mirror may be fixed in inclination and position relative to the platen. Since the platen is thus curved and since the reflecting surface of the second mirror is located on the axis about which the scanning lens moves, the original-to-mirror ray remains radial to the platen across the scan and the optical path length between any point on the original and the photoconducting surface of the drum is substantially constant.

The present invention also provides a copying machine including; a flat transparent platen having a surface for supporting an object; a drum having a photoconductive surface for receiving an image of an object on the platen; a first mirror positioned below and spaced from the platen and dimensioned and inclined with respect to the platen such that substantially the whole of the perpendicular projection of said surface of the platen falls on said first mirror; a lens mounted for movement along an arcuate path about an axis and constrained to have that axis intersecting the optical axis of the lens, to scan the image reflected in the mirror of an object on the platen; a second mirror on, and mounted for rotation about, the axis of rotation of the lens to reflect light passing from the lens onto the photoconductive surface of the drum; the first mirror being mounted both for movement perpendicular to its surface and for simultaneous tilting movement relative to the platen so that the length of the ray path between said surface of the platen and the scanning lens is maintained substantially constant.

In the alternative form of the invention, the platen has a flat object supporting surface and to compensate for the variation in the above-mentioned ray path length, during scanning the first mirror is moved perpendicularly to its reflecting surface and simultaneously tilted relative to the platen, these movements being executed more preferably by means of cams which support the mirror and by this means the ray path length is maintained substantially constant. The displacement of the mirror perpendicular to its surface compensates for the variation in optical path length during scanning which would otherwise occur, and the tilting ensures that the paths of rays from the image reflected from the first mirror lie on the optical axis of the scanning lens and ensures that the rate of scanning of the object by the first mirror maintains a linear relation with the rates of movement of the scanning lens and drum.

In both the above-mentioned possibilities of copier, i.e. flat or cylindrical platen types, the requirement, as mentioned above, that the first mirror is dimensioned and inclined relative to the object platen so that at least the greater part of the projection of the platen falls on the mirror ensures that the angle of the ray path portion closest to the original is maintained as nearly perpendicular to the original as possible, particularly at the ends of the scan where the problem of distortion and poor focus can be particularly critical.

Figure 2:
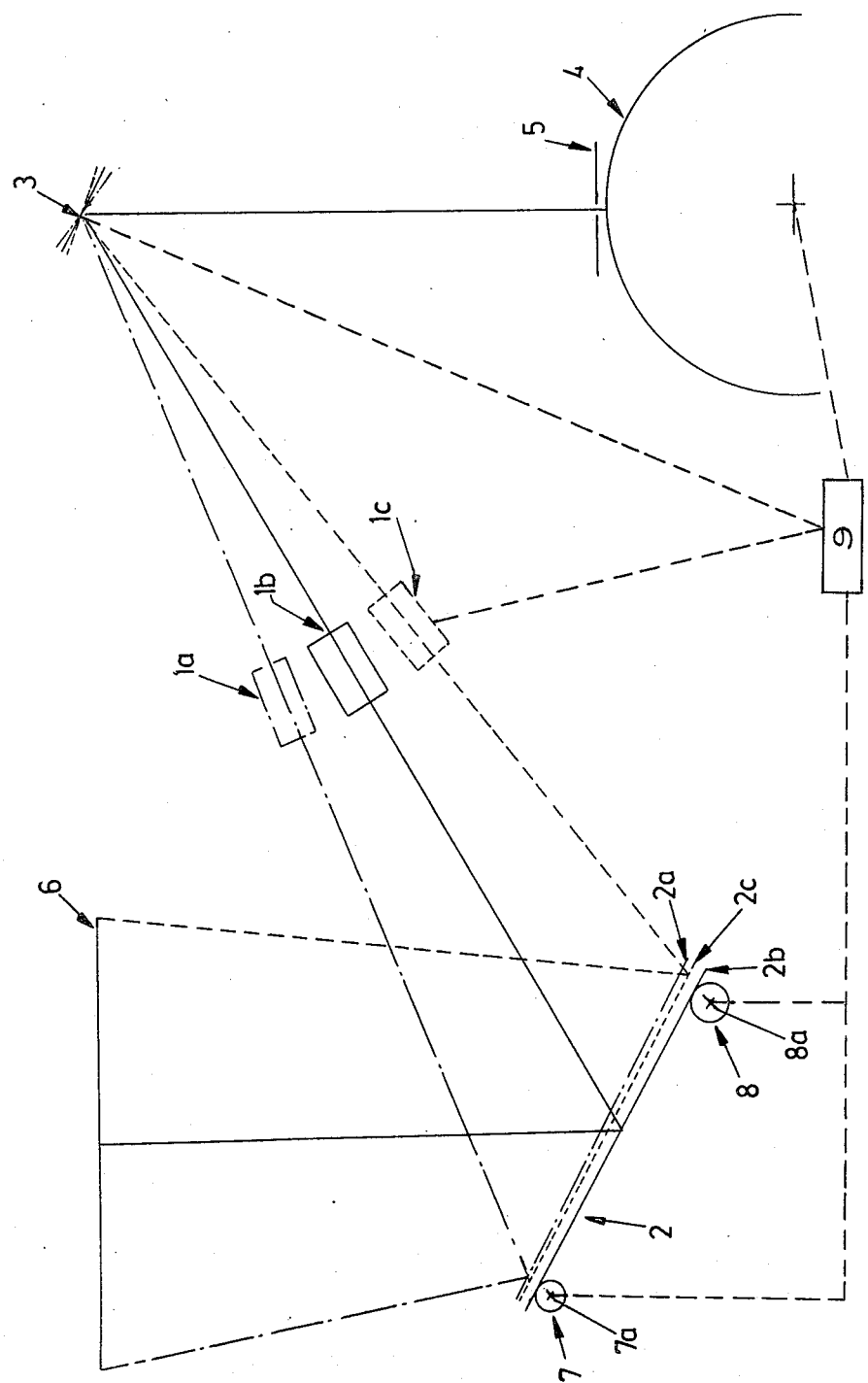

In order that the invention be more clearly understood, the following description is given, merely by way of example, reference being made to the accompanying drawings in which:

FIG. 1 shows one embodiment of copying apparatus according to the invention; and FIG. 2 shows a second embodiment of copying apparatus according to the invention.

In the electrostatic duplicator of FIG. 1, a cylindrical platen A supports an original document to be copied in a cylindrical configuration so that a scanning unit B positioned directly underneath the platen can traverse across the original to illuminate a strip of the original and to allow an image of that strip to be cast onto a stationary mirror C, the so-called object mirror.

The mirror C is planar and is intersected by substantially the whole of the horizontal projection of the platen so as to reflect the image from the scanning unit B through a lens D onto planar mirror E while the rays incident to the mirror are always substantially perpendicular, i.e. radial, to the cylindrical platen A. The lens D moves in an arcuate path having a common centre of rotation with, and at the surface of, the mirror E which pivots with the lens and thereby reflects the image onto the surface of a rotating drum F having an electrostatically charged photosensitive surface which acquires a latent image to be developed and transferred to a copy sheet later. As the scanning unit B moves across the original, the moving lens D moves in synchronism, for example through the three positions D1, D2 and D3 shown in FIG. 1, and similarly the pivoting image mirror E is rotated to maintain the reflected rays always concentrated at the desired upper part of the periphery of the drum F. Lens D and drum F are linked to a common drive means G.

The cylindrical shape of platen A and the arrangement of the arcuately moving lens are such that the ray length between any point on the original and the surface of drum F will be constant. This is illustrated in the broken line representation at the left of the drawing showing the apparent positioning of the original when viewed from mirror E.

For convenience of use of the copier for instance when copying from books, it is desired that a flat platen be used in place of the curved platen A.

FIG. 2 shows such a copier having a flat platen and including a form of compensating mechanism to ensure that the ray path between the original and the drum, and in particular between the original and the moving scanning lens, remains substantially constant, as it does in any case in FIG. 1, to maintain continuous sharpness of focusing of the image on the drum during each scan.

In FIG. 2 the corresponding parts have been given different references but it will be clear that the three positions 1a, 1b and 1c of the lens correspond to positions D1, D2 and D3 of FIG. 1, and that the object mirror 2 reflects the image from the original on platen 6 through the moving lens 1, off the pivoting image mirror 3 and onto the surface of the drum 4 by way of a slit 5.

In order to ensure that the distance between the extreme edges of the original and the lens in positions 1a and 1c is the same as the distance between the centre of the original and the lens in position 1b, the mirror 2 is movable between three positions 2a, 2b and 2c each corresponding to the lens positions having similar suffix letters. Thus from its starting position 2a, the mirror moves progressively downwardly to arrive in position 2b by the time the centre of the original is being scanned and then returns rightwardly and upwardly to arrive at position 2c by the time that the lens has arrived at position 1c.

Throughout this movement of the mirror 2, the lens has been describing a circular arc centered on the axis of pivoting of the planar mirror 3 so that the difference between the lens and the surface of drum 4 remains constant. Thus by virtue of the mirror movement to maintain the ray path between the original and the lens at a constant value, the focal point of the image scanned remains exactly on the surface of the drum 4. The working of this mirror movement can best be understood by referring to the position 2b as being a mean position of the mirror so that clearly any movement of the mirror towards the lens at the beginning or the end of scan will shorten the mirror-to-lens ray which implies a lengthening of the mirror-to-original ray thereby flattening the optimum platen shape to a planar form.

As the mirror 2 moves upwardly and rightwardly towards the platen 6 and the image mirror 3 it is necessary for some tilting of the mirror to take place in order that the appropriate portion of the original on the platen 6 will still be scanned at the desired instant by the lens 1. Considering for example the lens position 1a, the mirror-to-lens ray must be collinear with that illustrated in FIG. 2 but since it is intended in this position to scan the portion of the original on the extreme left-hand edge of the platen as viewed in FIG. 2, the original-to-mirror ray incident on the mirror 2 will have shifted through a small angle in the anti-clockwise sense. In order that this ray should be reflected along the same path as the mirror-to-lens ray of FIG. 2 it is necessary for the mirror 2 to be tilted through a small anti-clockwise angle as it is moved towards the lens and platen. A similar situation exists at the lens position 1c where the extreme right-hand edge of the platen is to be scanned.

In FIG. 2, the three different lens positions 1a, 1b and 1c are associated with different positions of the mirror-to-lens ray such that for lens position 1a the ray and the mirror position 2a are represented in chaindotted form, in lens position 1b the ray and the mirror position 2b are represented in continuous line form and in lens position 1c the ray and the mirror position 2c are shown in plain dotted line form.

One possible way of achieving the desired tilting and raising of the mirror employs cams 7 and 8 rotatable about the respective axes 7a and 8a such that each cam carries out one revolution per scan of the lens 1. The cam 8 has a higher lift than the cam 7 so that when the mirror is raised away from the full line position 2b its inclination to the horizontal changes together with its movement towards the platen and lens. The cams, lens, second mirror and drum may all be driven by common drive means 9.

During the rapid return movement of the lens from position 1c to position 1a the form of the cam 7 is such that the left-hand end of the mirror remains substantially stationary while the right-hand end lifts to attain the chain dotted line position 2a. The scan is then repeated.

In both FIG. 1, using a cylindrical platen, and FIG. 2, using a planar platen, the original-to-mirror ray remain substantially perpendicular to the original and platen thereby minimising distortion and optimising sharpness of focus.

We claim:

1. A copying machine including a platen; a surface for the platen for supporting an object to be copied; a rotatable drum; a photo-conductive surface for said drum for receiving an image of an object supported on the platen; a mirror positioned below and spaced from the platen and inclined with respect thereto; a lens mounted for movement along an arcuate path about an axis and constrained to have that axis intersecting the optical axis of the lens, to scan the image reflected in the mirror of an object on the platen; and a second mirror on and mounted for rotation about, the axis of rotation of the lens to reflect light passing from the lens onto the photoconductive surface of the drum; and wherein the first said mirror is dimensioned and inclined with respect to the platen so that substantially the whole of the perpendicular projection of said surface of the platen falls on said first mirror.

2. A copying machine as set forth in claim 1, wherein said platen surface conforms to a portion of a cylindrical surface; and said first mirror is positioned below and spaced from the platen and inclined with respect thereto.

3. A copying machine as set forth in claim 1, further comprising drive means for driving said scanning lens and drum.

4. A copying machine as set forth in claim 1, wherein the scanning lens is of fixed focal length.

5. A copying machine as set forth in claim 1, wherein the second mirror is flat.

6. A copying machine as set forth in claim 2, wherein the axes of rotation of the second mirror and drum are parallel with one another and with the axis of said cylindrical surface.

7. A copying machine including; a flat transparent platen having a surface for supporting an object; a drum; a photoconductive surface for said drum for receiving an image of an object on the platen; a first mirror positioned below and spaced from the platen and dimensioned and inclined with respect to the platen such that substantially the whole of the perpendicular projection of said surface of the platen falls on said first mirror; a lens mounted for movement along an arcuate path about an axis and constrained to have that axis intersecting the optical axis of the lens, to scan the image reflected in the mirror of an object on the platen; a second mirror on, and mounted for rotation about, the axis of rotation of the lens to reflect light passing from the lens onto the photoconductive surface of the drum; the first said mirror being mounted both for movement perpendicular to its surface and for simultaneous tilting movement relative to the platen so that the length of the ray path between said surface of the platen and the scanning lens is maintained substantially constant.

8. A copying machine according to claim 7, and further comprising cams for supporting the first mirror, which cams are rotated in synchronism with the movement of the scanning lens and rotation of the drum, the cams being shaped to provide both said movement of the mirror perpendicular to its surface and said tilting movement of the mirror relative to the platen.

9. A copying machine as set forth in claim 8, and further comprising common drive means for driving said scanning lens, said drum and said cams.

10. A copying machine as set forth in claim 7, wherein the scanning lens is of fixed focal length.

11. A copying machine as set forth in claim 1, wherein the second mirror is flat.

12. A copying machine as set forth in claim 8, wherein the axes of rotation of the second mirror and drum are parallel both with one another and with the axes of rotation of said cams.

* * * * *